(No Model.)

J. M. ROBINSON.
WIRE REEL.

No. 465,537. Patented Dec. 22, 1891.

Witnesses
E. S. Duvall Jr.
N. L. Collamer.

Inventor
Josiah M. Robinson.
By his Attorneys,
C. A. Snow & Co.

UNITED STATES PATENT OFFICE.

JOSIAH M. ROBINSON, OF KENESAW, NEBRASKA.

WIRE-REEL.

SPECIFICATION forming part of Letters Patent No. 465,537, dated December 22, 1891.

Application filed August 5, 1891. Serial No. 401,769. (No model.)

*To all whom it may concern:*

Be it known that I, JOSIAH M. ROBINSON, a citizen of the United States, residing at Kenesaw, in the county of Adams and State of Nebraska, have invented a new and useful Wire-Reel, of which the following is a specification.

This invention relates to wire-working, and more especially to that class of devices known as "reels" and "spools;" and the object of the same is to produce certain improvements therein.

To this end the invention consists in the details of construction hereinafter more fully described and claimed, and as illustrated on the sheet of drawings, wherein—

Figure 1:
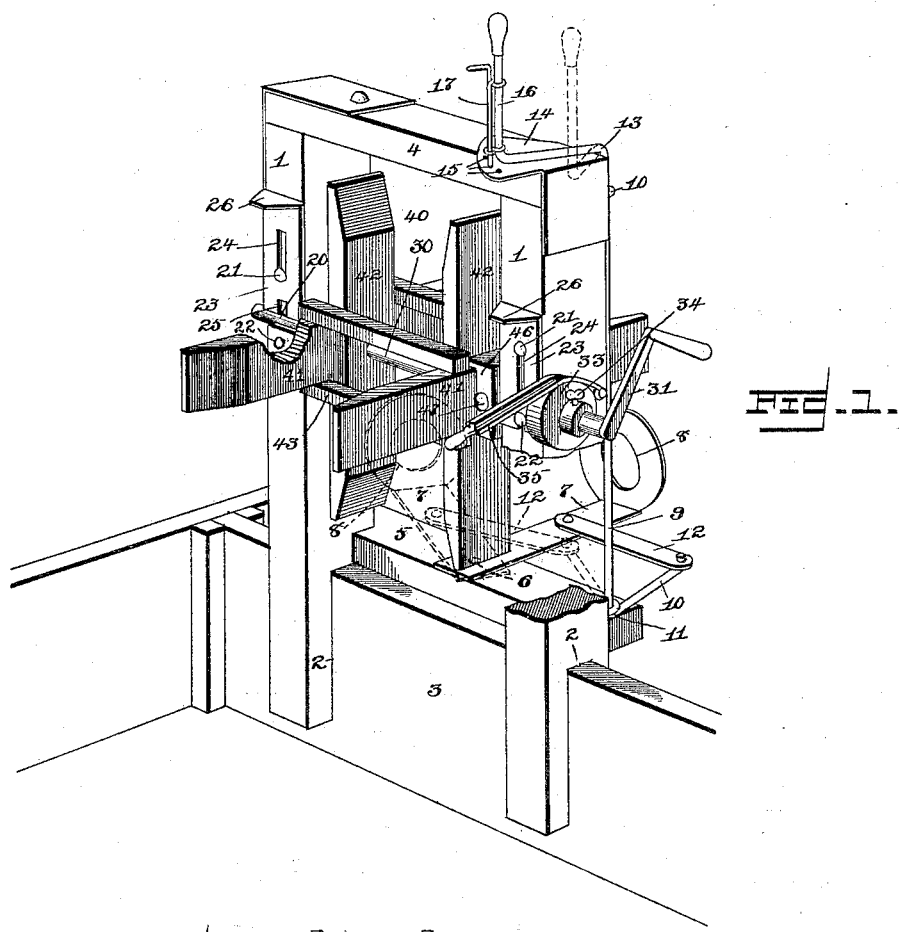
Figure 2:
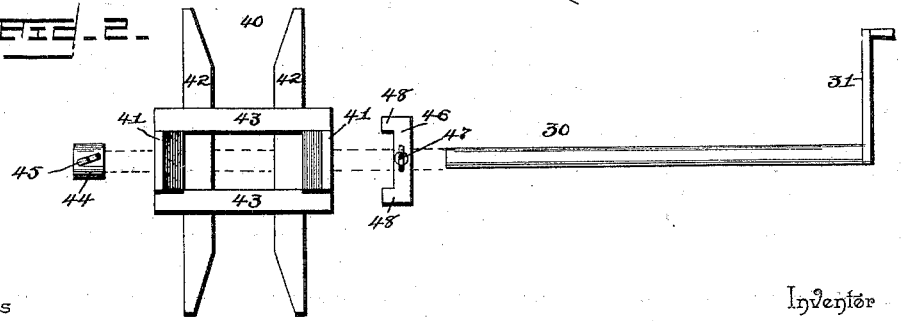

Figure 1 is a perspective view of this improved device viewed from the inside of a wagon-body and showing it as mounted on the end-gate thereof, certain parts being broken away. Fig. 2 is a detail in elevation of the shaft, the clutch, and the reel, all slightly separated.

Referring to the said drawings, 1 1 designate the side bars of a frame-work, which are provided with deep notches 2 in their lower ends, adapted to fit over the end-gate 3 of a wagon, and these side bars are connected by a top bar 4 and by a cross-piece 5, which stands above the upper ends of the notches 2. On a vertical pivot 6 in the cross-piece 5 is mounted an arm 7, which projects rearward and is turned up at its free outer end and provided with an eye 8, adapted to serve as a guide to the wire which is led to the spool.

9 is an upright rod journaled in eyes 10 in the rear side of the frame and having its lower end bent outwardly, as at 11, and connected by a link 12 with the arm 7, and the upper end of this rod is cranked, as at 13, so as to move over a plate 14, secured on the upper end of the frame, and provided with a series of holes 15, standing in a curved line concentric with the vertical portion of the rod 9. The upturned end 16 of this rod forms a handle by which it may be operated, and 17 is a sliding or spring-actuated catch mounted on the handle and adapted to take at its tip into one of the holes 15. By this construction an operator standing in the wagon-body can manipulate the handle 16 so as to move the guide in the proper direction or can lock it at any point by means of the catch 17.

In the inner edges of the side bars 1 are formed bearings 20, above and below each of which are pins or screws 21 22, and 23 is a locking-plate having a long slot 24 in its body, engaging the pin 21 and having a notch 25 in one end, adapted to engage the pin 22, there being one of such plates on each of the side bars. When these plates are raised by their handles 26, (and one of them is shown thus raised in Fig. 1,) their notches 25 disengage the pins 22, while their slots 24 slide on the pins 21 and their lower ends rise, so as to uncover the bearings 20 in side bars, after which the shaft of the spool can be removed from the frame. The said shaft 30 has a crank 31 on one end, and adjacent thereto a pulley 33 is secured on the shaft by a set-screw 34, taking through its hub, and 35 is a brake-lever pivoted to one of the side bars and adapted to be borne onto this pulley when it is desired to retard the revolution of the spool.

The spool as a whole is numbered 40, and it comprises outer end pieces 41, mounted on the shaft 30, inner end pieces 42, also mounted on the shaft 30, but inside of and at right angles to the end pieces 41, and cross-bars 43, secured in the four angles formed by the crossing of the end pieces. This spool is mounted loosely on the shaft 30, and is held against longitudinal movement in one direction by a stop 44, fastened to the shaft 30 by a set-screw 45, while it is held against movement in the opposite direction on and is caused to rotate with the shaft by a clutch 46, held on the shaft by a set-screw 47 and having bent ends 48, which embrace one of the outer end pieces 41.

In assembling the parts of this device the spool is mounted on the shaft, the latter is inserted in the bearings of the frame, and the fastening-plates are moved so as to close said bearings. The device is then mounted on the end-gate of a wagon, which is driven over the ground alongside the fence. If the wire is to be taken up, it is passed through the guide 8 and led to the spool, the operator turning the latter by the crank 31, so as to wind the wire on the spool, and simultaneously operating the cranked upper end 13 of the guide-operating rod, so as to cause the said guide to move from side to side, whereby the wire will be properly fed onto the spool. If the wire is to be paid out, the guide is thrown to the left as far as possible, as shown in dotted lines in Fig. 1, and the wire from the spool is not passed through the eye 8, and at this time the brake mechanism comes into play, as will be readily understood, to prevent a too rapid rotation of the spool. The latter may be removed from or adjusted longitudinally on the shaft, or said shaft may be removed from its bearings in the manner set forth above.

The device is simple in construction, inexpensive in manufacture, and easy to operate, and considerable change may be made in the details without departing from the spirit of my invention.

What is claimed as new is—

1. In a wire-reel, the combination, with the frame, a main shaft journaled in said frame, and a spool on the shaft, of an arm pivoted to the frame and having a guiding-eye at its outer end, an upright rod mounted in eyes of the frame and having an outturned lower end, a link pivotally connecting this end with said arm, and an operating-handle at the upper end of the rod, as and for the purpose set forth.

2. In a wire-reel, the combination, with the frame, a main shaft journaled in said frame, and a spool on the shaft, of an arm pivoted to the frame and having a guiding-eye at its outer end, an upright rod mounted in eyes of the frame and having an outturned lower end, a link pivotally connecting this end with said arm, a crank-handle at the upper end of said rod, a catch on said handle, and a plate on the frame, having a series of holes, with which said catch is adapted to engage, as and for the purpose set forth.

3. In a wire-reel, the combination, with the main shaft and a spool thereon, of the framework having bearings in its side bars, a plate adjacent each bearing and having a handle, the body of the plate being provided with a slot and the end opposite the handle with a notch, and pins in the side bar, engaging said slot and notch, as and for the purpose set forth.

In testimony that I claim the foregoing as my own I have hereto affixed my signature in presence of two witnesses.

JOSIAH M. ROBINSON.

Witnesses:
 FRANCIS PHILLIPS,
 OLLET WHETMORE.